July 25, 1972   F. J. DALARD ET AL   3,679,488
SILVER OXIDE-MAGNESIUM CELL OR ELECTROCHEMICAL GENERATOR
Filed Oct. 8, 1970

INVENTORS
FRANCIS JEAN DALARD
JAN WITOLD AUGUSTINSKY
BY JEAN-CLAUDE SOHM
Kenyon & Kenyon Reilly Carr & Chapin
ATTORNEYS 3,679,488
SILVER OXIDE-MAGNESIUM CELL OR
ELECTROCHEMICAL GENERATOR
Francis Jean Dalard and Jan Witold Augustinsky,
Grenoble, and Jean-Claude Sohm, Meylan, France, assignors to Société des Accumulateurs Fixes et de Traction (Société Anonyme), Romainville, France
Filed Oct. 18, 1970, Ser. No. 79,058
Claims priority, application France, Oct. 15, 1969,
6935369
Int. Cl. H01m 11/00
U.S. Cl. 136—100 M
25 Claims

ABSTRACT OF THE DISCLOSURE

The invention relates to an electrolyte for a cell having electrodes based respectively upon magnesium and preferably silver oxide. Other electrodes in lieu of silver oxide are also disclosed as useful, e.g. silver chloride, copper chloride or oxygen or air electrodes. In accordance with the invention, the electrolyte comprises an aqueous solution of sodium or lithium metaborate and sodium or lithium perchlorate and has a pH in the neighborhood of 11. In certain conditions, additives to the electrolyte solution, e.g. sodium tartrate improve operation of the cell in rapid discharge. The invention is applicable notably to rapidly discharging electrochemical generators.

RELATED APPLICATIONS

Figure 1:
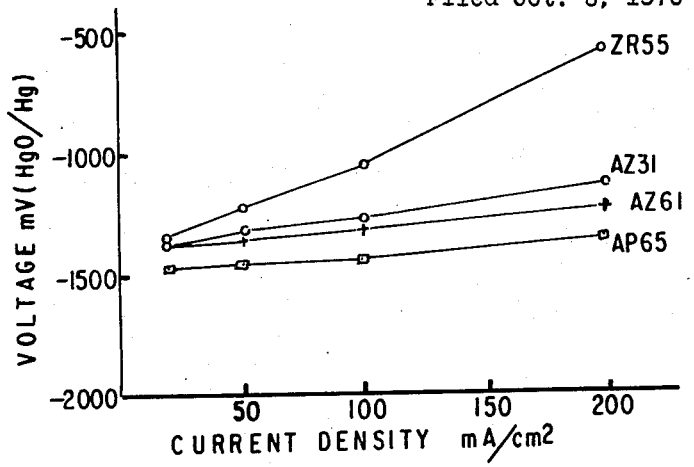

No related applications are co-pending.

BACKGROUND OF INVENTION

The present invention relates in general to improvements in a silver oxide-magnesium cell, and more particularly to electrolytes therefor as well as cells embodying such electrolytes. The thermodynamic characteristics of the AgO-Mg system are superior to those of the AgO-Zn and AgCl-Mg systems. It is for this reason that the association of a magnesium anode and of a silver oxide cathode is particularly interesting.

The theoretical electromotive force, energy per unit mass and energy per unit volume of the AgO-Mg system are higher than those of the AgCl-Mg and AgO-Zn system. In addition, magnesium has the advantage over zinc that it does not become passivated at high current density and has a lower specific mass, whereby the dead weight due to the excess of metal always present in the anode is reduced.

In addition, with an equal weight of silver, the silver oxide electrode possesses a capacity double that of the monovalent silver chloride electrode. This point is economically very important because silver is the most costly material entering into the manufacture of such cells. By reason of the very high current densities which can be obtained in the AgO-Mg cell, there may be expected from the latter a higher specific power than from its two competitors, at a cost which is at most equal.

The main problem posed by the silver oxide-magnesium cell consists in finding a suitable electrolyte. Hitherto, the magnesium electrode has generally been employed in aqueous electrolytes in which the pH is maintained at about 8.5 owing to the reaction equilibrium:

$$Mg^{2+} + 2OH^- \rightleftharpoons Mg(OH)_2$$

which is produced in the operation of the cell at the negative electrode. In such an electrolyte, a silver electrode cannot be used, because the silver oxide therein is too soluble.

Accordingly, the general object of this invention is to provide a novel and improved electrolyte-magnesium electrode association in a cell having a magnesium based electrode and another electrode of silver oxide or of other materials selected from the group consisting of metallic chlorides and air or oxygen electrode.

It is a more particular object of this invention to provide novel electrolyte for magnesium-silver oxide cells.

It is a further object and feature of this invention to provide novel magnesium anode cells embodying such novel electrolyte.

BRIEF SUMMARY OF INVENTION

The above cited objects, it has been discovered by us, can be accomplished by providing an electrolyte having a pH in the neighborhood of 11 and comprising an aqueous solution of sodium or lithium metaborate and perchlorate is suitable for the magnesium-silver oxide system (II). The optimum concentrations for the operation of the cell are respectively of the order of 3 to 4 moles of perchlorate and from 0.1 to 0.5 mole of borate per litre of solution.

In accordance with another feature of the invention, sodium tartrate, for example in a concentration of 0.05 mole per litre of solution, is advantageously added, whereby the operation of the cell in rapid discharge is further improved.

The constitution of the electrodes is also not immaterial. Thus, there will advantageously be employed in a cell embodying the invention, as starting material constituting the magnesium electrode, an alloy of the type AP65 also called GEMAG (manufactured by Magnesium Elektron Limited) or AZ61 (manufactured by the same company).

Other objects and features and advantages of the invention will become more clearly apparent when considered in view of the following detailed description and drawings forming a part hereof:

DETAILED DESCRIPTION OF THE DRAWINGS

FIG. 1 embodies curves showing as a function of current density as abscissae in ma./cm.$^2$ the polarization voltage plotted in mv. as ordinates in relation to a HgO/Hg reference electrode with the same electrolyte for four magnesium alloys.

Figure 2:
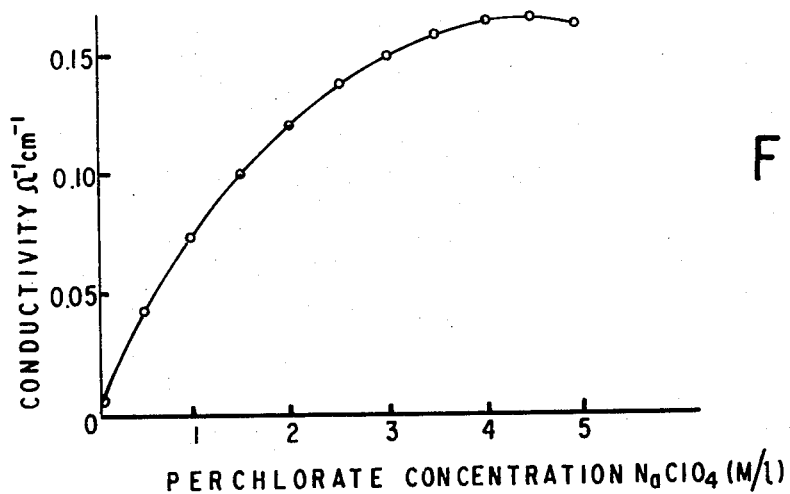

FIG. 2 presents curves illustrative of the conductivity of electrolyte embodying the invention and in which measured conductivity thereof is plotted as ordinates as a function of the perchlorate concentration as abscissae in moles per litre.

Figure 3:
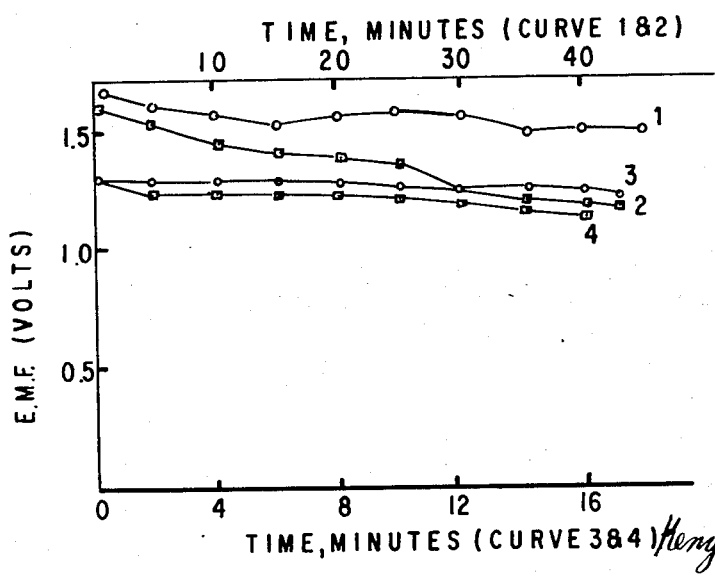

FIG. 3 presents curves illustrative of electromotive force (in volts) of cells embodying the invention plotted along the ordinates as a function of cell discharge time plotted in minutes along the abscissae, for different magnesium alloys.

DETAILED DESCRIPTION OF PREFERRED EMBODIMENTS OF THE INVENTION

As has previously been stated, the electrolytes hitherto employed in cells comprising a magnesium electrode have a pH in the neighborhood of 8.5 during operation. In such an electrolyte, a silver electrode cannot be used, because silver oxide (I) Ag$_2$O (an intermediate in the reduction of AgO to Ag) has appreciable solubility under these conditions. At a pH of 8.5, the solubility of the silver oxide (I) is in fact of the order of 10$^{-2}$ moles per litre. On the other hand, when the pH increases to the value 12, the solubility of the silver oxide (I) decreases. However, this increase in the pH reduces the activity of the magnesium. In accordance with the invention, a compromise has been chosen by fixing the pH of the electrolyte at about 11 by the addition of a boric acid salt, namely, lithium or sodium metaborate. For this value of the pH, the solubility of the silver oxide is lower than $10^{-4}$ moles per litre.

In order to render the magnesium active and to enable it to be employed as anode, there have been employed depassivating perchlorate anions emanating from lithium or sodium perchlorate. When a solution of sodium perchlorate ($NaClO_4$) and sodium metaborate ($NaBO_2$) is thus employed, it is experimentally observed that:

the silver oxide (I) present in such a solution is not converted into silver metaborate because the latter is more soluble than the oxide, the same is the case with magnesium, and there is, therefore, no consumption of borate ions during the operation of the cell, and the $ClO_4^-$ ions of the solution do not react with $Ag_2O$, since silver perchlorate is a readily soluble salt.

Various tests made with other anions such as $Cl^-$, $Br^-$, $SO_4^-$, acetates, citrates and other organic anions have not yielded satisfactory results, either because of their action on the positive silver electrode or because of an insufficient action on the negative magnesium electrode. To sum up, therefore, it seems that $ClO_4^-$ is the only depassivating anion which is compatible with the AgO-Mg systems.

Apart from the electrolyte, the constitution of the electrodes, and notably of the magnesium electrode has some importance.

In FIG. 1, there are shown four curves giving, as a function of the current density plotted along the abscissae in ma./cm.$^2$, the polarisation voltage plotted in mv. along the ordinates in relation to a HgO/Hg reference electrode in the same electrolyte for four magnesium alloys called ZR55, AZ31, AZ61 and AP65, respectively. The electrolyte was an aqueous solution having a pH of 11 and comprising two moles of sodium perchlorate and 0.5 mole of sodium metaborate per litre of solution.

The alloys employed are commercial alloys: AZ31 (Dow Chemical), AZ61, ZR55 and AP65 (Magnesium Elektron Limited). Their composition are the following:

COMPOSITION OF THE MAGNESIUM ALLOYS (IN PERCENTAGE BY WEIGHT)

| Alloy | Al | Zn | Pb | Mn | Various |
|---|---|---|---|---|---|
| AZ31 | 3.52 | 0.75 |  | 0.44 |  |
| AZ61 | 6.83 | 0.83 |  | 0.33 |  |
| AP65 | 6.50 | 0.4–1.5 | 4.7 | 0.5–0.3 |  |
| ZR55 | <0.02 | <0.015 |  |  | Zr:0.45–0.65 |

The polarization curves of FIG. 1, which were obtained with the four alloys referred to, show that the alloy AP65 (also called GEMAG) has the most negative voltage regardless of the current density. It is closely followed by the alloy AZ61.

Of course, the most active alloy is also that which corrodes most quickly. Thus, the alloy AP65 can only be employed in a primable cell, because the chemical attack which it undergoes is not negligible. On the other hand, the alloy AZ61 remains relatively well preserved. The same is the case with the silver electrode. After preservation for three months in an electrolyte composed of three moles per litre of sodium perchlorate at 0.25 mole per litre of sodium metaborate, no appreciable loss of capacity is observed. Only a slight lowering of the voltage of the silver electrodes is found. Thus, in addition to the construction of primable cells, the use of the invention for non-primable cells having a useful life of the order of a year or more may be envisaged.

Since the electrochemical discharge of the cell is then not accompanied by a parasitic chemical reaction, it may without disadvantage take place at relatively slow rates. This is not the case with sea water cells utilizing the silver chloride-magnesium system, in which the slow discharges take place with relatively low outputs owing to the chemical corrosion of the magnesium electrodes in the sea water.

The performances of the cell depend upon the composition of the electrolyte. Experience shows that the optimum metaborate concentration is between 0.1 and 0.5 mole of metaborate per litre, while the optimum perchlorate concentration is about 3 to 4 moles per litre. The relatively low value of the optimum metaborate concentration is explained by the reduction of the anodic activity of the magnesium when the metaborate concentration increases. On the other hand, in the absence of metaborate, the pores of the silver electrode may become clogged by precipitation of magnesium hydroxide.

With regard to the perchlorate ion, it has a double function: on the one hand, it activates the magnesium electrode and on the other hand it ensures the conductivity of the solution. In FIG. 2, in which the measured conductivity of the solution is plotted along the ordinates as a function of the perchlorate concentration plotted along the abscissae in moles per litre, it will be seen that the maximum conductivity is reached with a concentration of the order of four moles per litre. The optimum for the operation of the cell at normal temperature is about 3 moles per litre. A large excess of perchlorate is disadvantageous, undoubtedly owing to the increase in the viscosity of the solution. However, if the cell is to be employed at low temperature, it is necessary to increase the concentration to about 4 moles per litre.

The replacement of the $Na^+$ cation in the solution by the $Li^+$ cation does not substantially modify the aforesaid results, except perhaps at low temperature.

A further considerable advantage of the cell according to the invention resides in that, owing to the composition of its electrolyte, it can be used at low temperature. Silver chloride-magnesium cells utilizing electrolytes having substantially the composition of sea water cannot be used much below 0° C.

The operation of the cell may be further improved by adding complexing agents to the electrolyte. Thus, for rapid discharges, the addition of sodium tartrate ($Na_2C_4H_4O_6 \cdot 2H_2O$) makes the discharge curve much flatter, that is to say, the electromotive force of the cell falls less in the course of discharge. At the same time, it is found that the deposit which forms on the anode is less adherent and more uniform. The optimum tartrate concentration is about $5 \times 10^{-2}$ moles per litre. The improvement of the magnesium hydroxide deposit in the presence of sodium tartrate even renders possible the replacement of the alloy AZ61 by the more active alloy AP65. FIG. 3 illustrates these results.

In this figure, the electromotive force in volts of a cell according to the invention has been plotted along the ordinates as a function of the discharge time plotted in minutes along the abscissae. The curves comprising small circles (curves 1 and 3) relate to the alloy AP65, while the curves comprising squares (curves 2 and 4) relate to the alloy AZ61. The curves 1 and 2 correspond to a discharge at the constant rate of 100 ma./cm.$^2$ of electrode area, while the curves 3 and 4 correspond to a discharge density of 250 ma./cm.$^2$. In this test, the useful area of the electrodes was 6 cm.$^2$. The electrolyte had the following optimum composition: $NaClO_4$:3 M, $NaBO_2$:0.1 M and $Na_2C_4H_4O_6$:0.05 M.

In contrast to what happens in the absence of sodium tartrate, the electromotive force of the cell remains substantially constant throughout the discharge. The optimum effect is obtained with a concentration of the order of $5 \times 10^{-2}$ mole per litre of tartrate.

In cells according to the invention, the Faraday efficiency of the electrodes is of the order of 70% on average in the case of the silver electrode (related to the total weight of silver measured before the charge) and of the order of 75% in the case of the magnesium electrode.

It has been found possible to obtain current densities of 400 ma./cm.$^2$ on electrodes having a useful area of 11 cm.² with a mean voltage of more than 1 volt maintained for 10 minutes.

Even more rapid discharges have been obtained with current densities of 800 ma./cm.² on electrodes of 5.5 cm.², the voltage being maintained for more than 2 minutes at a value very slightly below 1 volt.

Of course, the invention is in no way limited to the embodiments and to the experiments described, which have been referred to only by way of illustration, and it includes all technical equivalents of the means described, as well as their combinations, if the latter have been carried out in accordance with the spirit of the invention as defined in the appended claims.

More particularly, although the invention concerning an electrolyte-magnesium electrode association has been described as very advantageous in the case of silver oxide-magnesium cells, it is also applicable when positive electrodes are employed which consist either of silver chloride or of copper chloride, or of an oxygen or air electrode.

What is claimed is:

1. Electrolyte for an electrochemical generator having a magnesium containing electrode and a positive electrode, said electrolyte comprising an aqueous solution of a perchlorate selected from the group consisting of lithium and sodium perchlorates together with a boric acid salt selected from the group consisting of lithium metaborate and sodium metaborate, said solution having a pH equal approximately to 11.

2. Electrolyte according to claim 1 wherein said solution also comprises sodium tartrate.

3. Electrolyte according to claim 1 wherein the perchlorate of the solution has a concentration of the order of 3 to 4 moles per litre.

4. Electrolyte according to claim 1 wherein the boric acid salt of the solution has a concentration of the order of 0.1 to 0.5 mole per litre.

5. Electrolyte according to claim 1 wherein said solution also comprises sodium tartrate and wherein the perchlorate of the solution has a concentration of the order of 3 to 4 moles per litre.

6. Electrolyte according to claim 2 wherein the tartrate in said solution has a concentration of the order of 0.5 mole per litre.

7. Electrolyte according to claim 5 wherein the tartrate in said solution has a concentration of the order of 0.5 mole per litre.

8. Electrolyte according to claim 1 wherein said solution also comprises sodium tartrate, the perchlorate in said solution has a concentration of the order of 3 to 4 moles per litre and the boric acid salt in said solution has a concentration of the order of 0.1 to 0.5 mole per litre.

9. Electrolyte according to claim 8 wherein the sodium tartrate in said solution has a concentration of the order of 0.1 to 0.5 mole per litre.

10. Electrolyte for an electrochemical generator having a magnesium base electrode and a positive electrode comprising an aqueous solution having a pH approximately of 11 and including a borate selected from the group consisting of sodium metaborate and lithium metaborate and also including a perchlorate selected from the group consisting of sodium perchlorate and lithium perchlorate.

11. Electrolyte according to claim 10 wherein said solution also includes an alkali metal tartrate.

12. Electrolyte according to claim 11 wherein said tartrate in said solution is sodium tartrate.

13. Electrolyte according to claim 11 wherein the tartrate in said solution has a concentration of the order of 0.5 mole per litre.

14. Electrolyte according to claim 10 wherein the borate in said solution has a concentration of the order of 0.1 to 0.5 mole per litre.

15. Electrolyte according to claim 10 wherein the perchlorate in said solution has a concentration of the order of 3 to 4 moles per litre.

16. An electrochemical generator comprising a magnesium base electrode, a positive electrode and an aqueous electrolyte, said electrolyte being an aqueous solution having a pH of approximately 11 and including a borate selected from the group consisting of sodium metaborate and lithium metaborate, said solution also including a perchlorate selected from the group consisting of sodium perchlorate and lithium perchlorate.

17. An electrochemical generator according to claim 16 wherein said magnesium base electrode is a magnesium containing alloy.

18. An electrochemical generator according to claim 17 wherein said alloy is selected from the group consisting of alloys consisting in percentage by weight respectively of 6.50 Al, 0.4 to 1.5 to Zn, 4.7, of Pb and 0.5 to 0.3 of Mn; 6.83 Al, 0.83 Zn, and 0.33 Mn; and 3.52 Al, 0.75 Zn and 0.44 Mn.

19. An electrochemical generator according to claim 16 wherein said positive electrode is selected from the group consisting of silver chloride and copper chloride.

20. An electrochemical generator according to claim 16 wherein said positive electrode comprises silver oxide.

21. An electrochemical generator according to claim 16 wherein said positive electrode is a gas electrode.

22. An electrochemical generator according to claim 21 wherein the gas electrode is an air electrode.

23. An electrochemical generator according to claim 21 electrode wherein the gas in an oxygen electrode.

24. Electrolyte for a cell having a magnesium containing electrode and a positive silver oxide electrode, said electrolyte comprising an aqueous solution having a pH approximating 11, said solution comprising a metaborate selected from the group consisting of sodium metaborate and lithium metaborate and also a perchlorate selected from the group consisting of lithium perchlorate and sodium perchlorate.

25. Electrolyte according to claim 24 wherein said solution also includes an alkali metal tartrate.

References Cited

UNITED STATES PATENTS

| | | | |
|---|---|---|---|
| 2,937,219 | 5/1960 | Minnick et al. | 136—154 |
| 2,993,946 | 7/1961 | Lozier | 136—100 M |
| 3,258,367 | 6/1966 | Robinson | 136—100 M |

DONALD L. WALTON, Primary Examiner

U.S. Cl. X.R.

136—155